United States Patent Office 3,629,469
Patented Dec. 21, 1971

3,629,469
METHOD FOR CONTROLLING BIRDS
Philip H. Derse, Madison, Wis., assignor to Wisconsin Alumni Research Foundation, Madison, Wis.
No Drawing. Filed Mar. 8, 1968, Ser. No. 711,497
Int. Cl. A01n 17/00
U.S. Cl. 424—17                                    1 Claim

ABSTRACT OF THE DISCLOSURE

A method for controlling bird population by feeding birds in a locale with a food composition containing antimycin as the toxic agent.

---

The present invention relates to a new method for controlling birds.

More specifically this invention relates to a new method for killing birds.

The control of bird population in certain localities for various reasons is highly desirable. For example, in many areas starlings have become an extreme nuisance and up to the time of the present invention efforts to control their roosting habits or their numbers have been either so expensive as to be prohibitive or have been ineffectual. These birds and others, e.g. gulls, albratross ("gooney birds"), because of large local concentrations have become a hazard in certain areas to the operation of aircraft. The protection of field crops from depredations by exceedingly large numbers of birds, e.g. sparrows, starlings, crows, is also at times an economic requirement. In addition, control of bird population may be a necessity in the control of a disease which is bird-transmitted or bird-perpetuated. Pigeons are considered to constitute a particular hazard in this regard because of their apparent natural affinity for populous areas and the filth which they distribute in such areas. Other factors, such as the preservation of certain bird species through control of other species in a locale, i.e. conservation or hunting preservation considerations, may motivate bird control efforts.

Earlier attempts at control of bird population through the use of poisons involved considerable hazard including the possibility of secondary poisoning where birds killed with the poisons were consumed by other birds or animals.

It is an object of this invention to provide a rapid and effective method for controlling bird population.

It is a further object of this invention to provide a method of controlling bird population which is essentially non-hazardous and which eliminates the possibility of secondary poisoning.

It is a still further object of this invention to provide a method for killing birds which is sufficiently rapid in its action to allow the dead birds to be confined to a small geogaphical area.

It has now been found that the foregoing objects can be achieved and that good control of unwanted species of birds can be obtained through the use of antimycin as the essential toxicant.

Antimycin is an antibiotic which is characterized by antifungal properties. This compound and its method of preparation are fully described in U.S. Letters Patent No. 2,657,170 to Keitt et al. It has also been found (U.S. Letters Patent No. 3,152,953) that antimycin, at extremely great dilutions, provides an effective means for killing fish in ponds, lakes, streams, etc.

The control of an unwanted species of birds through reducing the population of the species in a given locale can be accomplished in accordance with this invention by feeding the said birds a composition containing antimycin. The antimycin can be carried by any material which is voluntarily ingested by and which is particularly appealing to the bird species which it is desired to control. The many types of grain have been found to be excellent carriers for the antimycin toxicant where the toxicant composition has been applied to the grain surface by any convenient means, such as spraying.

With many bird species ingestion of antimycin at levels as low as about 1 to about 5 milligrams per kilogram weight of the bird, depending upon the particular species, was found to be effective in causing prostration and death in a short time. The level of antimycin required for killing a particular species of bird can be readily determined by preliminary tests and the amount of antimycin to be used in the feed composition functioning as a carrier can be adjusted in accordance with such tests and the feeding habits of the species. Levels from about 1 to 5 milligrams per kilogram have been found effective against, for example, sparrows, pigeons, ducks, and starlings. Chickens, on the other hand, appear to be unaffected by such small amounts of antimycin and this, of course, contributes to the safety of an antimycin-containing feed product for bird control in areas where domesticated fowl may have access to the feed product.

The use of toxicants for bird control prior to this invention has always been accompanied by the hazards of secondary poisoning. Thus, if birds killed by some poison were consumed in whole or part by other birds or animals, the consuming species was also in acute danger of being poisoned because of the poison content of the dead bird. This invention virtually eliminates the problem of secondary poisoning because of the rapidity at which the ingested antimycin degrades within the bird to a nontoxic material.

In addition, the rapid action of antimycin to prostrate the bird early in the toxicological stage provides a definite sanitary advantage and further contributes to the safety factor since the dead birds will be confined to a more limited geographical area. The specificity of various levels of antimycin to particular species can also be turned to advantage in contributing to the safety of the use of this compound as the essential toxicant in bird control.

The following examples are to be considered only as illustrative of this invention and are not to be construed as limiting its scope in any manner.

EXAMPLE 1

Toxicity studies were conducted on different species of fowl using antimycin diluted in absolute alcohol. The test birds were housed in wire bottomed cages and were supplied with an appropriate basal diet and water ad libitum. The antimycin dilutions were administered in a stomach tube intubation. The test condition and results are shown in the following table.

| Fowl specie | Body wt., kg. | Level, mg./kg. | Antimycin dilution | Dose, cc. | Mortality |
|---|---|---|---|---|---|
| Ducks | 1.025 | 3 | 100 mg./10 cc. alc | .31 | None. |
| | 1.725 | 3 | 100 mg./10 cc. alc | .52 | Do. |
| | 1.225 | *5 | 100 mg./10 cc. alc | .60 | Dead, 2 hr. |
| | 1.250 | *5 | 100 mg./10 cc. alc | .63 | Do. |
| | 1.100 | *5 | 100 mg./10 cc. alc | .55 | Dead, 3.5 hr. |
| Sparrows | .028 | 5 | 10 mg./10 cc. alc | .14 | Dead, 1 hr. |
| | .025 | 5 | 10 mg./10 cc. alc | .12 | Do. |
| | .021 | 5 | 10 mg./10 cc. alc | .10 | Do. |
| | .029 | 5 | 10 mg./10 cc. alc | .14 | Do. |
| | .027 | 5 | 10 mg./10 cc. alc | .13 | Do. |
| | .027 | 5 | 10 mg./10 cc. alc | .13 | Do. |
| Starlings | .069 | 5 | 10 mg./10 cc. alc | .34 | Dead, 1 hr. |

*Birds prostrate within one hour.

EXAMPLE 2

The procedure of Example 1 was followed, all subjects being dosed immediately following antimycin solution preparation. Test conditions and results are shown below.

| | | Mortality | |
|---|---|---|---|
| Fowl specie | Dose level, mg./kg. | No. dead/ No. dosed | Day of mortality |
| Duck | 1 | 0/3 | |
| | 2 | 1/4 | 1 |
| | 3 | 2/4 | 1 |
| | 4 | 4/4 | 1 |
| | 5 | 4/5 | 1 |
| | 10 | 1/1 | 1 |
| | 12 | 2/2 | 1 |
| Pigeon | 0.5 | 0/2 | |
| | 1 | 2/2 | 1 |
| | 2 | 1/2 | 1 |
| | 4 | 2/2 | 1 |
| | 10 | 1/1 | 1 |
| | 50 | 1/1 | 1 |
| Chicken | 5 | 0/1 | |
| | 10 | 0/1 | |
| | 1 20 | 0/1 | |
| | 40 | 0/1 | |
| | 80 | 0/1 | |
| | 1 160 | 0/1 | |
| Pheasant | 5 | 2/5 | (2) |
| | 25 | 2/2 | 1 |
| | 50 | 2/2 | 1 |

1 Antimycin administered via gelatin capsule orally, i.e. without dilution.
2 1-2 males dead. 2 females survived.

EXAMPLE 3

Toxicity studies were conducted to determine the effectiveness of antimycin as a bird control agent when incorporated in the food of the bird's diet.

Ten grams of ground corn and ten grams of a bird food having the basic composition set out below were ground with a mortar and pestle until powdery. 20 milligrams of antimycin diluted in 1 cc. of ethyl alcohol was mixed with each of the powders and the resultant mixture was mixed with 90 grams of like unground food material. The amount of antimycin is equivalent to 200 p.p.m. antimycin in the feed.

Bird food composition

Ingredients: Percent
Large proso millet seed _____ 43
Canary seed _____ 32
Rape seed _____ 10
Small millet seed _____ 10
Thistle seed, sesame seed, flax seed, psyllium seed, poppy seed, lettuce seed _____ 5

The antimycin-corn product was fed to a group of 9 mature wild sparrows (Group No. 1) while the antimycin-bird food product was fed to a group of 6 mature wild sparrows (Group No. 2) with the results indicated in the table below.

| Group No. | Food consumption per bird, gm. | Antimycin consumed per bird, μg. | Mortality |
|---|---|---|---|
| 1 | 1.4 | 280 | 9 |
| 2 | 1.9 | 200 | 6 |

The mortality rate of 100% was obtained in both groups after one day of feeding.

EXAMPLE 4

7.5 mg. of antimycin was diluted in 10 cc. of ethyl alcohol which was then mixed with 100 grams of the bird food of Example 3. The amount of antimycin was equivalent to 75 p.p.m. antimycin in the feed. The antimycin-bird food product was fed to a group of four mature wild sparrows.

The first mortality occurred on the second day of the test when the amount of antimycin consumed per bird was within the range of 150–360 μg. Three of the birds were dead after 36 hours on the food product with a maximum average consumption of antimycin per bird of 375 μg.

Having thus described the invention, what is claimed is:
1. The method of limiting the number of live birds selcted from the consisting of sparrows, pigeons, ducks, starlings and pheasants in a locale which comprises making accessible to said birds in such locale, food materials appealing to said bird species which contain, as the essential toxic ingredient, an effective amount of antimycin.

References Cited

UNITED STATES PATENTS 3,080,285  3/1963  Odenwald et al. _____ 424—17
3,150,041  9/1964  Goodhue et al. _____ 424—17
3,152,953  10/1964 Strong et al. _____ 424—121

OTHER REFERENCES

Miller, The Pfizer Handbook of Microbial Metabolites, pp. 133–34, McGraw-Hill Book Co., Inc., N.Y., 1961.
Chemical Abstracts I, vol. 44, p. 6563d, 1950.
Chemical Abstracts II, vol. 45, p. 2633g, 1951.
Chemical Abstracts III, vol. 65, p. 7820a, 1966.
Liu and Strong, J. Am. Chem. Soc., vol. 81, pp. 4387–90, August 1959.

ALBERT T. MEYERS, Primary Examiner

D. J. FUNDERBURK, Assistant Examiner

U.S. Cl. X.R.

424—17, 26